(12) United States Patent
Dershem

(10) Patent No.: US 11,475,103 B1
(45) Date of Patent: Oct. 18, 2022

(54) HEALTHCARE UNIVERSAL PATIENT PAYMENT GATEWAYS

(71) Applicant: Michael K Dershem, Voorhees, NJ (US)

(72) Inventor: Michael K Dershem, Voorhees, NJ (US)

(*) Notice: Subject to any disclaimer, the term of this patent is extended or adjusted under 35 U.S.C. 154(b) by 841 days.

(21) Appl. No.: 14/756,891

(22) Filed: Oct. 26, 2015

Related U.S. Application Data

(60) Provisional application No. 62/122,822, filed on Oct. 30, 2014.

(51) Int. Cl.
| | | |
|---|---|---|
| G06F 19/00 | (2018.01) | |
| G06Q 20/10 | (2012.01) | |
| G06Q 10/10 | (2012.01) | |
| G06Q 20/08 | (2012.01) | |

(52) U.S. Cl.
CPC .......... *G06F 19/328* (2013.01); *G06Q 10/10* (2013.01); *G06Q 20/0855* (2013.01); *G06Q 20/102* (2013.01); *G06Q 20/085* (2013.01)

(58) Field of Classification Search
None
See application file for complete search history.

(56) References Cited

U.S. PATENT DOCUMENTS

| | | | | |
|---|---|---|---|---|
| 7,606,721 | B1* | 10/2009 | Donnelly | G06F 19/328 705/2 |
| 2009/0138277 | A1* | 5/2009 | Warren | G06Q 10/10 705/2 |
| 2011/0071854 | A1* | 3/2011 | Medeiros | G06Q 40/08 705/4 |
| 2012/0239560 | A1* | 9/2012 | Pourfallah | G06Q 40/08 705/40 |
| 2013/0290177 | A1* | 10/2013 | Milam | G06Q 20/08 705/40 |
| 2014/0200909 | A1* | 7/2014 | Felix | G06Q 10/10 705/2 |

* cited by examiner

*Primary Examiner* — Rachel L. Porter

(57) ABSTRACT

Gateways for patient-responsibility portions of medical bills (PRPMB) transactions, regardless of healthcare provider or merchant services (Credit card processing) provider are disclosed. These principles provide uniform, consistent and secure devices, methods and systems that allow a patient to make PRPMB payments on one website or by one phone call or physical address regardless of the entity that is due payment, or when multiple entities are due payment.

3 Claims, 4 Drawing Sheets

PATIENT BILL

10

- 20 — PATIENT NAME ADDRESS
- 30 — PROVIDER NAME ADDRESS
- 30 — DIAGNOEIS: SERVICES: DATE;
- 35 — AMOUNT PAID BY INSURANCE −$XXX.XXX
- 40 — AMOUNT DUE $XXXX.XXX (PRPMS)

PLEASE REMIT TO: — 50
XXXXXX
XXXXXX

60
UNIQUE PATIENT IDENIFIER
−> ABLDEFAA
PAY AT −>
www.mapay.com

70
SMART TAG
~~~

*FIG. 1*

HEALTHCARE UNIVERSAL PATIENT PAYMENT GATEWAYS

RELATED APPLICATIONS

This application claims the benefit of U.S. Provisional Patent Application Ser. No. 62/122,822 filed on Oct. 30, 2014 entitled HEALTHCARE UNIVERSAL PATIENT PAYMENT GATEWAYS, the teachings of which are incorporated herein by reference.

FIELD OF THE DISCLOSURE

The principles disclosed herein relate generally to payment for medical services. More specifically, the principles disclosed herein relate to automated payment systems for patient-responsible portions of bills related to medical services.

BACKGROUND

Today there exist many ways for a patient to make payment to an individual healthcare provider from which the patient may have had services performed and for which a balance is due. This balance may be due because the patient has a balance after a third party (e.g. insurance company, Medicare, Medicaid) has made their portion of payment responsibility; or it could be a co-pay; or the patient has assumed all financial responsibility of services rendered by the healthcare provider (e.g. Doctor, hospital, clinic). These payments, called "patient-responsible portions of medical bills" (PRPMB) can be made by check, credit card, debit card, money orders in person, via the mail, over the phone or over the internet. For the insurance carriers and government program payment providers, there already exists "clearing houses" that provide mechanisms to aggregate payments to providers, but not such systems exists for aggregating PRPMBs for patients.

There are many issues that exist in the current methods for paying the PRPMB. One such problem is that every provider must be paid directly for their own unique services rendered to the patient. For instance, many unique services are provided to a sick child when a responsible party takes the child to the local Emergency Room. After being triaged the child is seen by a physician contracted to the ER. The child might need to get x-rays. The child is then subsequently released after an overnight stay and sees the pediatrician for follow-up.

After all of these and other services are rendered, the responsible party would then receive separate billing statements from each individual service provider requesting payment. After insurance pays its obligations to the individual providers, should the responsible party want to pay the PRPMB the individual providers online via a credit card, the patient would go on to the providers' own websites or a separate payment page that is given on the patient's billing statement. Often times the patient will need to set up an account through these individual entities' websites. Once the time consuming activity of setting up the account is completed, the patient can then place their payment over the website and the payment is accepted. This transaction is processed by the merchant services provider of the unique medical provider. Thus, if this responsible party had seven different statements she would need to do this seven times, even though this may be the only and last time of any interaction with a particular medical provider.

There is a need for systems, devices and methods to solve the aforementioned needs in the art, and other related needs. The art has not heretofore solved these problems.

SUMMARY

The principles disclosed herein provide gateways for PRPMB transactions, regardless of healthcare provider or merchant services (Credit card processing) provider. These principles provide uniform, consistent and secure devices, methods and systems that allow a patient to make PRPMB payments on one website or by one phone call or physical address regardless of the entity that is due payment, or when multiple entities are due payment.

The present principles include, but are not limited to, a patient billing record which will be issued by an entity responsible for collecting from a patient amounts owed for healthcare services rendered to the patient comprising; a field indicating a provider of the healthcare services rendered by the provider to the patient, a field indicating the healthcare services rendered to the patient by the healthcare provider, a field indicating a date on which the healthcare services were rendered to the patient, a field indicating an amount paid for the services by an entity other than the patient, a field indicating a patient-responsible portions of medical bills ("PRPMB") which is remaining due after the amount paid for the services by an entity other than the patient, and a field providing a unique patient identifier which identifies the patient and allows an entity which collects the PRPMB to electronically identify the patient and that the patient owes the PRPMB.

The present principles also include, but are not limited to, methods and gateways for allowing a patient to pay patient—responsible portions of medical bills ("PRPMB") which is remaining due after an amount paid for healthcare services by an entity other than the patient; comprising; a processor configured to aggregate how many healthcare service providers must be paid a portion of the PRPMB that is associated with a bill that the patient receives and which are further uniquely identified with the patient through a unique patient identifier on the bill, and which will determine how the PRPMB is to be distributed if more than one healthcare service provider is due a portion of the PRPMB uniquely associated with the patient, and a processor configured to receive medical bill records associated with the healthcare service providers and for which PRPMB is due and to provide routing information to the gateway so that the PRPMB can be allocated amongst the healthcare service providers after the aggregator processor determines that PRPMB are due to healthcare service providers from patients with unique identifiers.

The present principles will be best understood by those with skill in the art by reading the following Detailed Description in conjunction with the drawings which are first described briefly below.

BRIEF DESCRIPTION OF THE DRAWINGS

FIG. 1 is a drawing of medical bill or statement for a patient detailing PRPMBs due, and the patient's unique identifier that can be used to satisfy the PRPMBs.

DETAILED DESCRIPTION

Figure 2:
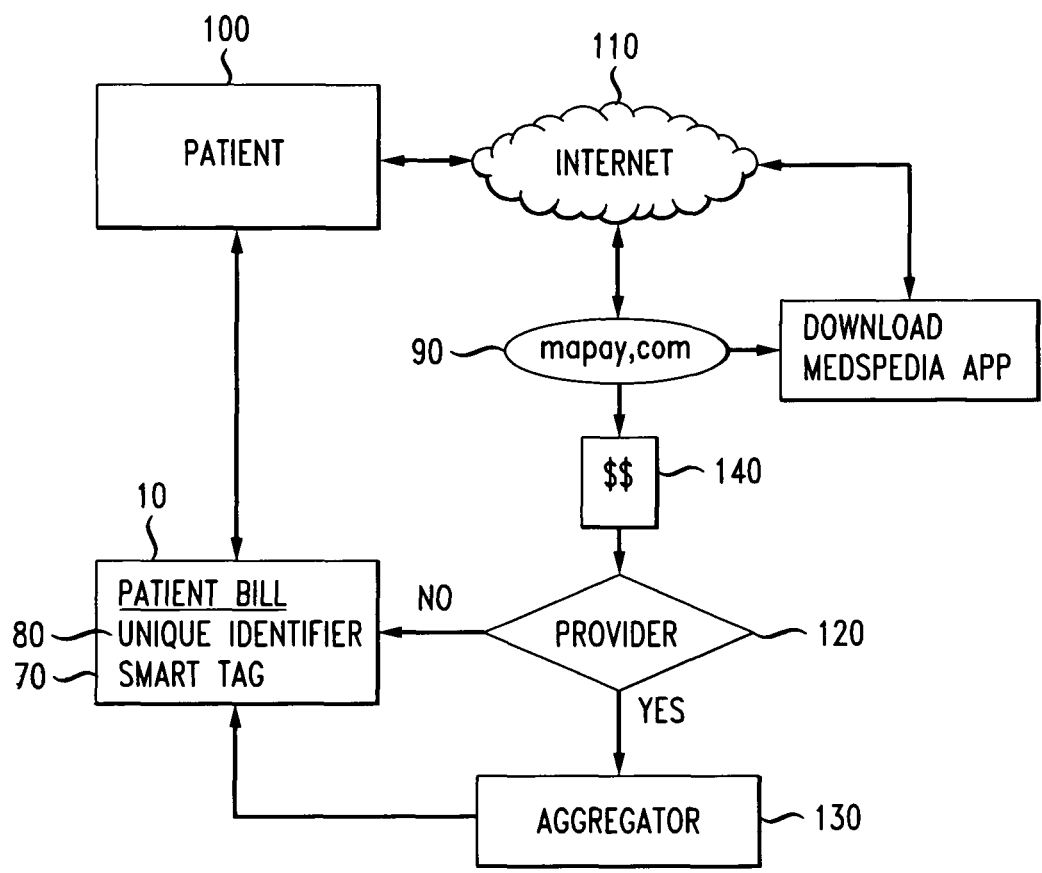
FIG. 2 is a block diagram of a system through which the patient can satisfy the PRPMB.

Referring now to the drawings wherein like reference numerals refer to like elements, FIG. 1 illustrates patient bill or statement 10. As is traditional, the bill 10 has the patient name and address 20, the medical provider's name and address 30, the diagnosis and services rendered, as well as the date rendered 30, and the amount paid 35 by insurance providers, government providers or any other entity other than the patient that is responsible for at least a portion of the amount owed for the services. It will be appreciated that a patient could receive many such bills from different providers for many different types of services. There exist today billing companies and other entities that aggregate such bills and send monthly bills and statements to patients on behalf of medical service providers that contract with the billing companies to perform billing services. Thus, bill 10 could contain the aforementioned information for one medical provider, or a plurality of medical providers, all of which require payment from the patient and other entities, for example insurance companies, for medical services rendered.

In all such instances, a PRPMB 40 will be shown on the bill 10. Typically, an indication 50 will also be provided setting forth the place to which the payment should be remitted, for example an address, wire transfer account number, bank, etc. Also, the method of payment, for example, credit card, check, etc. will also be delineated. In accordance with the present principles, the bill 10 will also be provided with an indication 60 of paying the PRPMB 40 through the use of a smart tag 70 or other electronic-recognizable media 70, such as a QR or bar code, as well as a unique patient identifier 80, which sets forth, at least for billing and payment purposes, a set of numbers, characters or a combination thereof, which the present systems, devices and methods can use to uniquely identify a patient for which PRPMBs are due. When the unique patient identifier 80 or smart tag 70 is used, it is then very simple and straightforward for the patient to go to a website 90 indicated in indicator 60, called www.mapay.com, which is a website or gateway that will allow processing of the PRPMBs in accordance with the present principles.

Every healthcare related patient billing statement 10 would have a unique statement number/identifier/SmartTag 70, 80 as shown in FIG. 1. Referring now to FIG. 2, patients 100 and medical providers 120 (or billing companies contracted by medical providers 120) can interact with the gateway 90 through a network 110, such as the Internet. It will be appreciated that the network 110 would be a secure network, a virtual private network or a network specifically implemented for the purposes of the present principles. A medical provider 120, billing company contracted by medical providers, statement processor, or other entity that prepares and sends bills and statements to the patient 100 would opt into the gateway 90, for example on a monthly basis, to upload bills 10 to gateway 90 having the unique statement identifiers 80 (or SmartTags 70) which could be generated by the medical providers' practice management systems, or billing companies contracted by the medical providers. Should the possibility exist that there are produced duplicate unique identifiers 80 or SmartTags 70, the gateway 90 will have secondary information, billing amount, last name, etc. to assure correct payment to the statement.

Preferably, gateway 90 comprises an aggregator function 130 which allows the gateway 90 to determine how many providers must be paid the PRPMB from the bills 10, and which will determine how the patient's payments should be allocated. The patient 100 will log in to mapay.com 90 with a password, for example, and the aggregator 130 will associate the patient with its bills. As it is a strong possibility that the patient 100 will not make full payment for all of the PRPMBs that are due, the patient can allocate how much of his payment should go to individual medical providers, or the aggregator can make that decision based on other criteria if the patient does not specify amounts. The amounts paid this way may be pro rata amounts, or each medical provider may have a separate agreement with the owner of the gateway 90 for payment percentages from patients. All such possibilities and equivalents may be implemented by aggregator 130.

The gateway 90 will then route payment 140 to the medical provider's merchant services account and/or regular bank if it is a check, health savings account or crypto currency. The crypto currency would have an auto-conversion feature to allow the funds to be dispersed in regular currency. Now the patient on one website could log on and make all payments at once regardless of how rendered service. The gateway would also have the capabilities for a provider to opt in for pre-authorized payment plans as a convenience for the patient. Each statement would reflect an automated payment plan whereby the balance would be paid over a series of subsequent payments. The gateway 90 itself, the merchant services account operator of the medical provider, or the merchant services account operator of the gateway mapay.com 90 can send the medical service provider the full amount due, or a percentage amount due if the patient has not paid the entire bill, and then either charge a fee which can be passed through to the owner of gateway 90, or a small percentage of the amount paid to the owner of the gateway 90 for the services the gateway 90 provides in this payment process and method. Alternatively, gateway 90 may send transactions directly through the merchant services account of the medical provider 120.

Advantageously, billing companies, practice management system providers, large integrated healthcare networks, government entities, insurance carriers, and individual providers may opt to brand (white label) their own provider's payment sites which may all then ultimately be processed by the gateway 90 having the appropriate service platform designed for their uses. The present principles are modifiable to accommodate all such needs.

Figure 3:
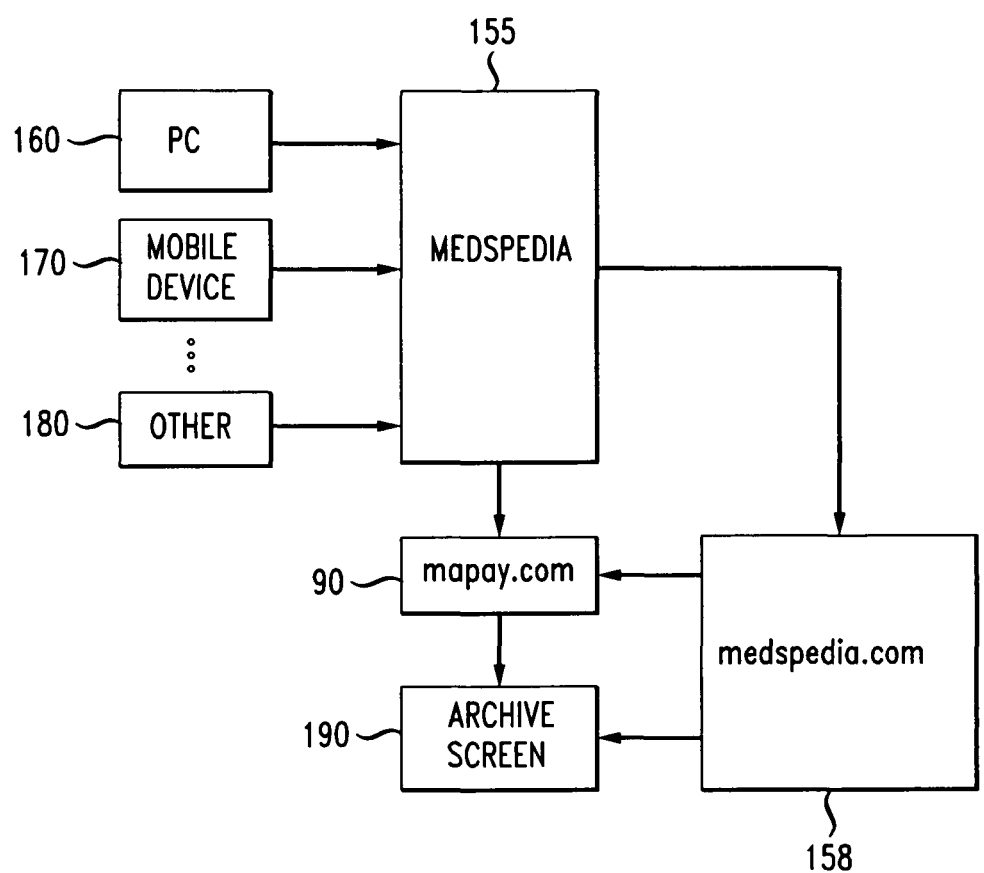
FIG. 3 is a block diagram of a system showing an app that can interact with the system of FIG. 2.

Additionally the gateway 90 may implement a prepaid or "fast track" stored valued, linked to a Health Savings Accounts or credit card through an application ("app") that is designed for use by a patient 100 in handheld, mobile, computer of other device. Referring to FIG. 3, an app 155 is illustrated and is herein denoted as "MEDspeedia". Medspeedia 155 is preferably a consumer side website, www.medspeedia.com 158, and allows for the patients to provide MEDspeedia account information to providers for payments to be drawn from upfront or after services rendered. This integrated app will allow for loading of personal medical providers 120 of the patient and/or search for these providers so that PRPMBs which are owed to them can be paid by the patient. Providers 120 may opt in to allow payments from MEDspeedia app 155 by providing routing information to the MEDspeedia website while not opting to have patient statements part of the gateway 90. It will also allow scanning any SmartTag 70 for payments, for example through a barcode reader, QR (quick response) reader.

The Medspeedia app 155 may also interface alternatively with the mapay.com gateway 90 if it is desired to integrate the services provided by the gateway 90. Otherwise, it is possible that medspeedia.com 158 will provide all of the necessary functionality for the patients 100 to interact with the providers to pay their PRPMBs. The Medspeedia app 155 may reside on a PC 160 or any type of desktop or laptop computer, on a mobile device 170 such as a Table or cell phone, or on any other type of device 180 which can process Medspeedia's data and transactions. Patients 100 and other users will be able to store and archive payment transactions 190 which are then viewable visually through a screen or which can be otherwise accessed and sent for review, even those not processed through www.mapay.com gateway 90, and can easily pull this information to send to medical providers or others should there be a dispute or question concerning any transaction. Today the burden relies on the patient 100 to hunt through old credit card statements and/or bank statements and, once found, try to get that information to the provider. Ultimately the patient 100 or user could allow a medical provider, attorney or other entity access to their MEDspeedia account to verify transaction record, or the patient 100 could push this information archived in Medspeedia to a requesting entity.

Moreover, Medspeedia (or for that matter mapay.com) could provide a platform with which the patient contacts the medical provider to dispute, question or otherwise engage the provider about the amount due. In this manner, the present principles allow a dispute resolution mechanism to be set up and executed without the need for further intervention or interaction by mapay.com or Medspeedia. Additionally, Medspeedia or mapay.com, or a combination of these entities, could participate in or facilitate dispute resolution. The capability has not heretofore been available in the art. The Medspeedia app, as well as the mapay.com gateway can also be adapted to interface with, and to take a feed from all the various payment portals from all the individual providers sites in order to have visibility of all of the PRPMBs that are currently due. This will allow the patient to efficiently track to pay all of the PRPMBs that are owed, even though they are serviced by different statement providers. Thus, Medspeedia and/or mapay.com integrate the payment requirements across many different platforms and providers, which has not heretofore been achieved in the art.

Additionally, if real time claims adjudication becomes reality, Medspeedia and mapay.com could act as an independent arbitrator for such adjudications. "Real time adjudication" is the notion wherein the total amount due for a medical provider's service (the insurance provider's part, the patient's co-pay, and other parts of the payment, for example the remaining part after the deductible for the year has been hit) is calculated and paid at the time the service is provided. Currently, it is not possible to achieve real time adjudication of the fee due. The mapay.com gateway and/or Medspeedia app could provide for a calculation of this amount, and apply a patient's stored credit card information to the bill for the real time payment. It may be that this payment is within a small difference of what is actually due, and so a final adjudication is undertaken later. In this case, the patient may be reimbursed for the small overpayment, or the medical provider given the remaining small amount due if there has been an underpayment after the real time amount is paid. The advantage here is that the medical provider receives payment earlier than normal and is not forced to hold the bill payment and lose a great deal of its money's time value. The patient will better understand their responsibilities when the adjudication is completed closer to time of occurrence, as in most day to day transactions. Thus, mapay.com and/or Medspeedia may also comprise a real time adjudicator module with appropriate software and hardware to implement real time adjudication and further payments reconciliation. This has not heretofore been achieved in the art.

The present principles also aid in other possibilities for healthcare management, and patient loyalty and rewards. Medspeedia or mapay.com could further facilitate patients timely submitting the PRPMBs by rewarding the patients for coming on and paying, for example with reward points, coupons, and other incentives. Medical providers could also be similarly rewarded for placing their statements on the mapay.com and Medspeedia. Yet a further module with appropriate software and hardware may be provided to mapay.com and/or Medspeedia to accomplish the incentive rewards.

Medical providers 120 may opt to pay a premium, similar to the way Google search prioritizes search ranking by paid sponsors. This would effectively move a provider's billing record to the top of the payable list on a patient's Medspeedia "payments due" screen. Government entities could also use the Medspeedia app 155 and website 158 on the patient side so that if healthcare entitlement payments come to the patient, the government payment entity (or for that matter even a private insurance company) could use Medspeedia 155 to transfer the payments. For example, a medical disability payment that a patient 100 receives as a result of an insurance policy or a government entitlement can be processed on the patient's Medspeedia account, and the patient could then pay their PRPMBs with this money through Medspeedia 155, 158, or even directly through the gateway mapay.com 90.

Figure 4:
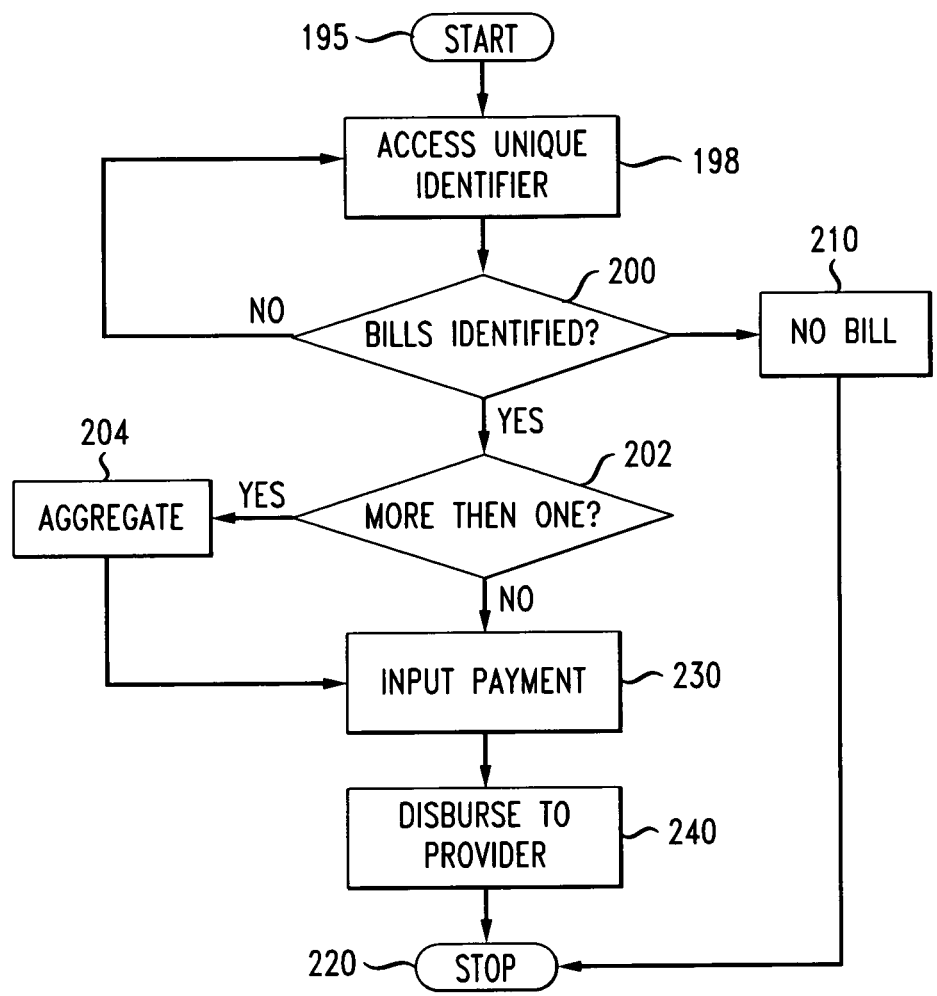
FIG. 4 is a flow chart preferred principles described herein.

Referring to FIG. 4, a flowchart of preferred methods of the present principles is illustrated. The method starts at 195, and at 198 accesses, or is given access to the unique identifier 80 or SmartTag 70. The method then determines at step 200 whether a bill for the patient has been identified. If not, then the method then either returns to step 198 to search new unique identifiers or SmartTags, or to verify the input unique identifier, for a specific number of attempts as set by the system, or determines at 210 then no bill exists for the patient so identified and so stops at 220.

If at some point it is determined that a valid bill for a patient having a PRPMB that is due, then at step 202 it is determined whether more than one provider must be paid a PRPMB with the patient's incoming payment. If so then an aggregation step as described above is implemented at step 204, and the payment input is accepted at step 230. If not, then only a single provider must be paid the PRPMB and, even if this is only a partial payment, the payment input is accepted by the system at step 230. All of these steps can be done either through the mapay.com gateway 90, or through the Medspeedia app 155 and medspeedia.com website 158, or through a combination of all three of these entities. Moreover, the mapay.com gateway 90, Medspeedia app 155, and medspeedia.com website or gateway could be owned and operated by separate entities, or all owned and operated by a single entity. After the payment is accepted from the patient or person paying the PRPMB on behalf of the patient at step 230, the medical provider or multiple medical providers are disbursed their payments by the gateway 90, Medspeedia app 155, or medpeedia.com website or a combination thereof.

As will be appreciated by those skilled in the art, the systems, apparatus and methods described herein can be implemented in hardware, software or firmware, or combinations of these modalities, in order to provide flexibility for various environments as discussed throughout this disclosure. Application specific integrated circuits (ASICs), programmable array logic circuits, discrete semiconductor circuits, processors configured to perform inventive functions, and programmable digital signal processing circuits, computer readable media, transitory or non-transitory, among others, may all be utilized to implement the present invention. These are all non-limiting examples of possible implementations of the several preferred embodiments of the present principles, and it will be appreciated by those skilled in the art that other embodiments may be feasible.

There have thus been described certain preferred embodiments of methods and apparatus for healthcare universal patient payment gateways. While preferred embodiments have been described and disclosed, it will be appreciated by those with skill in the art that modifications are within the true spirit and scope of the described principles.

What is claimed is:

1. A method performed by a processor in a gateway of paying patient—responsible portions of medical bills ("PRPMB") which are remaining due after an amount paid for healthcare services that have been paid by entities other than the patient; comprising:

generating by the gateway a unique patient identifier and providing the unique patient identifier to an entity responsible for generating and collecting the PRPMB from the patient so that the entity responsible for generating and collecting the PRPMB can place the PRPMB on a patient's bill;

receiving at the gateway the patient's bill which will be issued by the entity responsible for generating and collecting from the patient the PRPMB owed for healthcare services rendered to the patient, the bill comprising:

a field indicating a provider of healthcare services rendered by the provider to the patient, a field indicating the healthcare services rendered to the patient by the healthcare provider, a field indicating a date on which the healthcare services were rendered to the patient, a field indicating an amount paid for the services by entities other than the patient, a field indicating the PRPMB which is remaining due after the amount paid for the services by entities other than the patient, and a field providing the unique patient identifier which identifies the patient and allows the entity which generates and collects the PRPMB to electronically identify the patient and determine that the patient owes the PRPMB;

accessing the unique identifiers associated with the patient and identifying whether a bill for the patient has been received;

determining by the gateway whether more than one healthcare service provider is due a portion of the PRPMB that the patient will pay based on whether bills have been received from the healthcare service providers;

associating by the gateway the patient with each of the bills that have been determined to have a PRPMB due using the unique patent identifier of the patient; and aggregating by the gateway the payments due the healthcare service providers and paying pro rata to all healthcare service providers owed a portion of the PRPMB as specified by the patient through the gateway, wherein aggregating further comprises the steps of:

determining how many healthcare service providers must be paid the pro rata portion of the PRPMB that is associated with the bill that the patient receives and which are further uniquely identified with the patient through the unique patient identifier on the bill;

determining how the PRPMB is to be distributed if more than one healthcare service provider is due a portion of the PRPMB uniquely associated with the patient, and if only a single healthcare service provider is owed the PRPMB routing on behalf of the patient the full PRPMB to the single healthcare provider; and routing on behalf of the patient the pro rata portion of the PRPMB owed to each healthcare service provider when more than one healthcare service provider is owed a portion of the PRPMB, wherein generating further comprises associating, by the entity responsible for generating and collecting the PRPMB, a smart tag with the unique patent identifier field to allow the patient to pay the PRPMB at the gateway or at a website which are adapted to read the smart tag to recognize that the PRPMB is due in accordance with the unique patient identifier.

2. The method recited in claim 1, wherein generating further comprises providing a field indicating a website or gateway which directs the patient to access to pay the PRPMB with the smart tag.

3. The method recited in claim 2, wherein generating further comprises providing a field indicating a remittance address for payment of the PRPMB should the patient not desire to go to the website or gateway to pay the PRPMB with the smart tag.

* * * * *